United States Patent
Altemark et al.

(10) Patent No.: US 8,335,594 B2
(45) Date of Patent: Dec. 18, 2012

(54) WIND FARM CAPABLE OF STAGGERED DISCONNECTION

(75) Inventors: Jens Altemark, Rendsburg (DE);
Martin von Mutius, Ascheffel (DE);
Dirk Steudel, Kiel (DE)

(73) Assignee: REpower Systems AG, Hamburg (DE)

( * ) Notice: Subject to any disclaimer, the term of this patent is extended or adjusted under 35 U.S.C. 154(b) by 902 days.

(21) Appl. No.: 12/227,200

(22) PCT Filed: May 7, 2007

(86) PCT No.: PCT/DE2007/000827
§ 371 (c)(1),
(2), (4) Date: Nov. 10, 2008

(87) PCT Pub. No.: WO2007/128287
PCT Pub. Date: Nov. 15, 2007

(65) Prior Publication Data
US 2009/0102195 A1 Apr. 23, 2009

(30) Foreign Application Priority Data
May 10, 2006 (DE) .......... 10 2006 021 982

(51) Int. Cl.
*G05D 11/00* (2006.01)
(52) U.S. Cl. ....................................... 700/287
(58) Field of Classification Search .......... 700/287, 700/290, 297, 298
See application file for complete search history.

(56) References Cited

U.S. PATENT DOCUMENTS

| | | | |
|---|---|---|---|
| 6,688,841 B1 | 2/2004 | Wobben | |
| 7,605,487 B2 * | 10/2009 | Barton et al. | 290/44 |
| 7,834,472 B2 * | 11/2010 | Rebsdorf et al. | 290/44 |
| 2002/0029097 A1 * | 3/2002 | Pionzio et al. | 700/286 |
| 2004/0141272 A1 | 7/2004 | Wobben | |
| 2005/0090937 A1 | 4/2005 | Moore et al. | 700/286 |
| 2006/0222465 A1 | 10/2006 | Seidel et al. | |
| 2007/0290426 A1 | 12/2007 | Trede et al. | |
| 2008/0238100 A1 | 10/2008 | Altemark et al. | |

FOREIGN PATENT DOCUMENTS

| | | |
|---|---|---|
| DE | 195 32 409 A1 | 3/1997 |
| DE | 199 26 553 A1 | 12/2000 |
| DE | 101 37 272 A1 | 2/2003 |

(Continued)

OTHER PUBLICATIONS

International Preliminary Report on Patentability in corresponding PCT application PCT/DE2007/000827 (mailed Nov. 8, 2008)(6 pages) (in German language).

(Continued)

*Primary Examiner* — John Cottingham
*Assistant Examiner* — Chad Rapp
(74) *Attorney, Agent, or Firm* — Nash and Titus, LLC (57) ABSTRACT

The invention relates to a method of operating a wind farm intended for connection to an electric power network, which wind farm includes at least three wind turbine generator systems. At least one actual value for a wind speed or a parameter associated with wind speed is determined for each wind turbine generator system which are divided at least temporarily into predetermined groups. A first disconnect value is assigned to one group of wind turbine generator systems and a second different disconnect value is assigned to a second group of wind turbine generator systems. Actual values are assigned to disconnect values, and compared thereto. When the actual value exceeds the disconnect value the associated group of wind turbine generator systems is automatically disconnected.

20 Claims, 4 Drawing Sheets

FOREIGN PATENT DOCUMENTS

| | | |
|---|---|---|
| DE | 10 2004 060 943 A1 | 7/2006 |
| EP | 1 132 614 A | 9/2001 |
| EP | 1 164 691 | 12/2001 |
| EP | 1 571 746 A1 | 9/2005 |
| WO | WO 03/030329 A | 4/2003 |
| WO | WO 2004/099604 A2 | 11/2004 |
| WO | WO 2004/099604 A3 | 11/2004 |
| WO | WO 2004/114493 A | 12/2004 |

OTHER PUBLICATIONS

English translation of International Preliminary Report on Patentability in corresponding PCT application PCT/DE2007/000827 (mailed Dec. 10, 2008)(12 pages).

German Office Action in priority application DE 10 2006 021 982.1 (dated Apr. 25, 2007) (3 pages) (in German language).

English translation of German Office Action in priority application DE 10 2006 021 982.1 (dated Apr. 25, 2007) (5 pages).

International Search Report in corresponding PCT application PCT/DE2007/000827 (mailed Nov. 7, 2007)(6 pages).

International Written Opinion Search Report in corresponding PCT application PCT/DE2007/000827 (mailed Nov. 7, 2007)(9 pages).

Erich Hau, Windkraftanlagen, Springer Verlag Berlin, 3rd ed, 2003, cover page, pp. 357-361,463-465,512,513,530-541,575-578, (in German language)(designated Ref E1 and E1a).

Erich Hau, Wind Turbines, 2nd ed., Springer Verlag Berlin, 2003, cover page, pp. 357-361,468-470,520-522,582-586,537-549 (in English)(designated Ref E1 and E1a, English).

Siegfried Heier, Windkraftanlagen, Teubner Verlag Stuttgart, 3rd ed. 2003, front page, pp. 441-453. (in German language)(designated Ref E2).

Siegfried Heier, Grid Integration of Wind Energy Conversion Systems, John Wiley & Sons, 1998, cover page, pp. 326-339 (in English language)(designated Ref E2, English).

Webpage taken from website "Fakten zum Windpark in Freisen" (http://www.windpark-saar.de/2_wp.htm), printed on Aug. 14, 2008, in German language (designated Ref E3).

English translation Webpage from website "Fakten zum Windpark in Freisen" (http://www.windpark-saar.de/2_wp.htm), printed on Aug. 14, 2008, (designated Ref E3, English).

E. ON Netz GmbH, "Netzanschlussregein, Hoch-und Hochstspannung", dated Aug. 1, 2003., pp. 1-55 (in German language)(designated Ref E12).

English translation of E. ON Netz GmbH, "Grid Code High and Extra High Voltage", dated Aug. 1, 2003, (in English language)(designated Ref E12, English).

\* cited by examiner

|    | At1 (Gi), t1   | At2 (Gi), t2  | At3 (Gi), t3 |
|----|----------------|---------------|--------------|
| G1 | 25 m/s, 10 min | 30 m/s, 1 min | 35 m/s, 1s   |
| G2 | 24 m/s, 10 min | 29 m/s, 1 min | 34 m/s, 1s   |
| G3 | 26 m/s, 10 min | 31 m/s, 1 min | 36 m/s, 1s   |

Table 1

Fig. 2

|    | Et1 (Gi), t1   | Et2 (Gi), t2  |
|----|----------------|---------------|
| G1 | 20 m/s, 10 min | 18 m/s, 3 min |
| G2 | 19 m/s, 10 min | 17 m/s, 3 min |
| G3 | 21 m/s, 10 min | 19 m/s, 3 min |

Table 2

Fig. 3

| AL1 (WEA1) = 30 m/s | L1 = 1MW |
|---|---|
| AL (WEA1) = 25 m/s | L = 2MW |
| AL2 (WEA1) = 20m/s | L2 = 3MW |

Table 3

Fig. 4

WEA1

Fig. 5

WIND FARM CAPABLE OF STAGGERED DISCONNECTION

FIELD OF THE INVENTION

The invention relates to a method of operating a wind farm and a method of operating a wind turbine generator system in said wind farm, and a wind farm and a wind turbine generator system with which said methods can be implemented.

BACKGROUND OF THE INVENTION

From WO 03/030329 A1 a method of operating a wind farm which is connected to an electric power network is known. In this method, a correlation between wind speed and output capacity of the wind farm is input into a data processing unit. This correlation controls the output capacity of the wind farm based upon the wind in such a way that at high wind speeds, the wind farm can provide only a limited output, to prevent damage to the individual wind turbine generator systems. The disadvantage of the described wind farm is that the control process is relatively complicated because the output control, which is dependent upon wind speed, leads rapidly to control instabilities, and the output capacity is determined by wind speed.

SUMMARY OF THE INVENTION

The object of the invention is to provide a wind farm and a method of operating a wind farm which is capable of supplying electric power at the widest possible range of wind speeds.

The object of the invention is especially to provide a wind farm and a method of operating a wind farm, and to provide a wind turbine generator system and a method of operating the wind turbine generator system, which is capable of supplying electric power at an externally preset output capacity at the widest possible range of wind speeds.

DETAILED DESCRIPTION OF THE PREFERRED EMBODIMENTS

The first object is attained with a method described above having the characterizing features as set forth herein. In particular, in the main embodiment our invention entails a method of operating a wind farm comprising at least two wind turbine generator systems (WEA1, WEA2, WEA3, WEA4, WEA5), which is intended for connection to an electric power network. For each of the at least two wind turbine generator systems (WEA1, WEA2, WEA3, WEA4 and WEA5) at least one actual value (vt1(WEA1), ..., vt3(WEA5)) for a wind speed and/or for a parameter associated with wind speed is determined. The at least two wind turbine generator systems (WEA1, WEA2, WEA3, WEA4, WEA5) are divided, at least temporarily, into at least two predeterminable groups (G1, G2, G3), and each wind turbine generator system of the first group (G1) is assigned at least one first disconnect value (At1(G1), At2(G1), At3(G1)). Each wind turbine generator system of the second group (G2) is assigned at least one second disconnect value (At1(G2), At2(G2), At3(G2)) which is different from the at least one first disconnect value (At1(G1), At2(G1), At3(G1)). The at least one actual value (vt1(WEA1), ..., vt3(WEA5)) is assigned to one of the disconnect values (At1(G1), ..., At3(G3)). The actual values (vt1(WEA1), ..., vt3(WEA3)) are compared with the assigned disconnect values (At1(G1), ..., At3(G3)), and if the assigned actual value (vt1(WEA1), ..., vt3(WEA3)) exceeds a disconnect value (At1(G1), ..., At3(G3)), the wind turbine generator system or group of wind turbine generator systems (G1, G2, G3) which is assigned to the disconnect value (At1(G1), ..., At3(G3)) is automatically disconnected.

According to the invention, the at least two wind turbine generator systems of the wind farm are divided into groups, which can be predetermined. The separation into groups can also be subject to change over time. Each wind turbine generator system of the first group is assigned at least one first disconnect value, and each wind turbine generator system of the second group is assigned at least one second disconnect value, which is different from the at least one first disconnect value. In addition, for each of the at least two wind turbine generator systems, at least one actual value for wind speed and/or a parameter associated with wind speed is determined. Each at least one actual value which is assigned to a wind turbine generator system is assigned at least one disconnect value which is assigned to the same wind turbine generator system. The actual values are compared with the assigned disconnect values, and, when the assigned actual value exceeds a disconnect value, the assigned wind turbine generator system or group of wind turbine generator systems is automatically disconnected.

In one preferred embodiment of the invention, a parameter associated with wind speed, such as the pitch angle of the rotor blade, is measured, rather than the wind speed itself. In this embodiment of the invention, the assigned disconnect values are disconnect angle values, and precisely one disconnect angle value is preferably assigned to each wind turbine generator system. For each of the wind turbine generator systems, the pitch angle of the rotor blade is continuously measured by a pitch angle measuring device. Disconnect angle value and pitch angle are compared in a comparator unit, and, if the measured pitch angle exceeds the disconnect angle value, the wind turbine generator system or the group of wind turbine generator systems is disconnected, preferably automatically, by a disconnection device.

In one particularly preferred embodiment of the invention, the at least one actual value which is assigned to a specific wind turbine generator system is selected as at least one mean value. In what follows, mean value refers especially to a sliding mean value or an up-down counter mean value, or to some other calculation process for producing a mean. In the first case, the average wind speed is continuously calculated for an expired time interval of constant length. In the second case, the time during which the wind speed remains above a preset disconnect value is measured. When the speed drops below the disconnect value at a certain time, the time measurement begins again from that point in time. If the wind speed remains above the value for a predetermined span of time, a disconnect signal is issued.

In a preferred further improvement on the invention, a plurality of sliding mean values are determined over the same number of different averaging periods. The average and sliding wind speed is determined for preferably three different averaging periods, and for each of the wind turbine generator systems. The disconnect values assigned to the sliding mean values are established as mean disconnect values for the same averaging periods, and for each of the groups of wind turbine generator systems or individual wind turbine generator systems.

The mean disconnect values for the different groups or wind turbine generator systems are different from one another over the same averaging period. Each of the different averaging periods can therefore be assigned a different mean disconnect value. Preferably, the same averaging periods for the different groups are assigned mean disconnect values that differ from one another only slightly, whereas different averaging periods for the same group are assigned mean disconnect values that differ more significantly from one another. By dividing the wind farm into groups having different mean disconnect values, a sudden disconnection of the entire farm if one of the mean disconnect values is exceeded by the actual value is prevented.

Preferably, at least one of the groups comprises at least two wind turbine generator systems, and especially preferably, each of the groups comprises at least two wind turbine generator systems. A disconnection within the context of this invention does not necessarily mean a shutdown of the rotor, and can also mean only a termination of the infeed of current into the electric power network.

In a preferred embodiment of the invention, the wind speed at each wind turbine generator system along the farm is continuously measured using allocated anemometer units. The anemometer unit can comprise a data processing unit, in which the sliding mean values for the different averaging periods can be calculated individually for each wind turbine generator system. The sliding mean values of the at least one predetermined averaging period, but preferably of the different predetermined averaging periods, are supplied to a comparator unit, where they are compared with the mean disconnect values for the wind speed that are assigned to the same averaging periods. If one of the sliding mean values exceeds a mean disconnect value for a wind turbine generator system, which is assigned to the same averaging period, the wind turbine generator system is disconnected. The wind turbine generator systems of the entire group to which the one wind turbine generator system belongs can also be disconnected.

In this case, the acquisition of the anemometer readings, their further processing, their comparison and, if applicable, the connect order can be implemented via a central unit in the wind farm, or, most preferably, in a decentralized fashion, via controls for the individual wind turbine generator systems. In the latter case, only the allocation of the wind turbine generator system to the groups occurs via the central unit, which may also be configured as a physical module in a wind turbine generator system.

Favorably, the mean disconnect values are selected to be higher, the shorter the selected averaging periods within a group. Therefore, at only slightly elevated wind speeds wind turbine generator systems need to be disconnected only after an extended period of time, while under heavy wind gusts the same wind turbine generator system is disconnected after only a short period of time, and under hurricane-force winds is disconnected immediately.

Preferably, the set of disconnect parameters contains parameters for precisely two or precisely three different averaging periods, with these averaging periods preferably lasting 10 min, 1 min and 1 sec.

By selecting different mean disconnect values for the same averaging periods for the different groups of wind turbine generator systems a complete "knockout" of a wind farm is prevented for the most part. If a mean disconnect value is exceeded by one of the sliding mean values in a wind turbine generator system, this wind turbine generator system, or, in a preferred embodiment of the invention, all wind turbine generator systems which are assigned to the same group at that particular time, are disconnected. The wind turbine generator systems of the other groups remain in operation. Although this decreases the output of the wind farm, at least this lower level of output remains available.

To lessen the long-term overloading of a group of wind turbine generator systems resulting from the selection of particularly high disconnect values, the disconnect values can be redistributed among the groups after a predetermined time interval, preferably cyclically. In this manner, a statistically uniform loading of the wind turbine generator systems can be implemented over time.

The object with respect to the wind farm is attained with a wind farm having at least two wind turbine generator systems, which is intended for connection to an electric power network, and which has the characterizing features as described herein. For instance, the wind farm may comprise at least two wind turbine generator systems (WEA1, WEA2, WEA3, WEA4, WEA5), which is intended for connection to an electric power network, with an anemometer (WM1, ..., WM5), located at each wind turbine generator system (WEA1, ..., WEA5), which determines at least one actual value (vt1 (WEA1), ..., vt3(WEA5)) for a wind speed or a parameter associated with wind speed. It may further include an allocation device (11), which divides the at least two wind turbine generator systems (WEA1, WEA2, WEA3, WEA4, WEA5) at least temporarily into at least two predeterminable groups (G1, G2, G3), and assigns at least one first disconnect value (At1(G1), At2(G1), At3(G1)) to each wind turbine generator system (WEA1, WEA2) of a first group (G1), and assigns a second disconnect value (At1(G2), At2(G2), At3(G2)), which is different from the first disconnect value (At1(G1), At2(G1), At3(G1)), to each wind turbine generator system (WEA3) of a second group (G2). It may also have a comparator unit (12) for comparing the at least one actual value (vt1(WEA1), ..., vt3(WEA3)) of a wind speed or a parameter associated with wind speed with the assigned disconnect values (At1(G1), ..., At3(G3)). It may have a disconnection device (13) which disconnects the wind turbine generator system or group (G1, G2, G3) of wind turbine generator systems assigned to the mean disconnect value (At1 (G1), ..., At3(G3)) in the event that the actual values (vt1 (WEA1), ..., vt3(WEA3)) of a wind speed or a parameter associated with wind speed exceed a disconnect value (At1 (G1), ..., At3(G3)).

The wind farm of the invention preferably has a measuring device on each of the wind turbine generator systems, which detects, preferably continuously, an actual value for a wind speed and/or a parameter that is associated with wind speed. In an allocation device, the multiple wind turbine generator systems are divided into at least two groups, which may be predetermined. Each wind turbine generator system of a first group is assigned at least one first disconnect value, and each wind turbine generator system of a second group is assigned a second disconnect value, which is different from the first disconnect value. In a comparator unit, a comparison of the assigned disconnect value with the at least one actual value for wind speed and/or one parameter associated with wind speed is conducted for each of the wind turbine generator systems. If the at least one disconnect value is exceeded by the at least one assigned actual value, the disconnection device disconnects the assigned wind turbine generator system, or even the entire group of wind turbine generator systems.

Preferably, an anemometer is located at each wind turbine generator system for the purpose of determining the wind speed and calculating the sliding mean values.

The assignment of the mean disconnect values and averaging periods to the individual groups and the division of the groups among one another are accomplished using an allocation device. The assignment to groups is preferably rearranged following predetermined time intervals, preferably cyclically.

In wind farms whose wind turbine generator systems are exposed to varying wind speeds over a monitored time period, for example over a year, the wind turbine generator systems that are exposed to the milder winds can be assigned to a group that has high mean disconnect values, and the wind turbine generator systems that are exposed to the heavier winds can be assigned to a group that has low mean disconnect values. In this case, the mean disconnect values are preferably not reassigned at all.

The comparison of the sliding mean values for wind speed with the mean disconnect values is conducted in one central or a plurality of decentralized comparator units, each situated near a wind turbine generator system. The disconnection of the respective wind turbine generator system necessitated when the mean disconnect values are exceeded is implemented via one central or a plurality of decentralized disconnection devices provided for this purpose, each situated near a wind turbine generator system. These devices can also be configured as programs of a programmable processor.

The object is especially attained with a method of operating at least one wind turbine generator system having the characterizing features whereby the at least one wind turbine generator system (WEA1, WEA2, WEA3, WEA4, WEA5), which is intended for connection to an electric power network, has at least one actual value (vt1(WEA1), . . . , vt3(WEA3)) for a wind speed and/or a parameter associated with wind speed that is determined. It has an adjustable output capacity (L) and/or a parameter associated with output capacity that is predetermined for the at least one wind turbine generator system (WEA1, WEA2, WEA3, WEA4, WEA5). It has at least one disconnect value (AL(WEA1)) based upon output capacity, which corresponds with the adjustably predetermined output capacity (L) and/or the parameter associated with output capacity, and one of the at least one disconnect values (AL(WEA1)) based upon output capacity is assigned to each of the at least one actual values (vt1(WEA1), . . . , vt3(WEA3)). At least one actual value (vt1(WEA1), . . . , vt3(WEA3)) is compared with the at least one assigned disconnect value (AL(WEA1)) which is based upon output capacity, and, if the actual value (vt1(WEA1), . . . , vt3(WEA3) exceeds the disconnect value (AL(WEA1) which is based upon output capacity, the assigned at least one wind turbine generator system (WEA1, WEA2, WEA3, WEA4, WEA5) is automatically disconnected.

According to the invention, at least one actual value for wind speed and/or a parameter associated with wind speed is determined for the at least one wind turbine generator system. An adjustable output capacity and/or a parameter associated with output capacity are determined in advance for the at least one wind turbine generator system, and a disconnect value based upon output capacity, which corresponds with the adjustable output capacity and/or the associated parameter, is provided. The parameter associated with output capacity can, for example, be a rotor speed. The corresponding disconnect value based upon output capacity can be predetermined externally. However, it is also conceivable for it to be determined from the adjustable, predetermined output capacity, for example via calculation. Preferably, precisely one disconnect value based upon output capacity is assigned to the actual value, and is compared with it. If the actual value for wind speed and/or for a parameter associated with wind speed should exceed the disconnect value, which is based upon output capacity, the at least one wind turbine generator system will be automatically disconnected.

It has been found that a wind turbine generator system which is operated at a low output capacity can be disconnected at other, especially higher disconnect values than a wind turbine generator system that is operated at a high output capacity, and is then exposed to the same loads.

This is especially true if, along with output, speed is also reduced. This can involve operation at a constant torque, in other words, the speed is reduced by the same amount as the output. For the generator and converter system, a more extensive reduction of torque is advantageous.

In a preferred embodiment of the method of the invention, sliding mean values for wind speed are determined as actual values for at least one predetermined averaging period. A disconnect value, based upon output capacity, is assigned to each actual value, and is determined from the preferably externally predetermined output capacity and from the averaging period. The disconnect value based upon output capacity is preferably determined from two disconnect values for the wind turbine generator system and for the predetermined averaging period and associated predetermined output capacities. In this case, determination is made, for example, via interpolation.

It has been found that a wind turbine generator system that is operated at a low output capacity can be exposed to higher wind speeds without sustaining damage, whereas a wind turbine generator system that is operated at its nominal capacity can be exposed only to relatively low wind speeds. According to the invention, this connection takes into account the fact that an adjustable output capacity for the wind turbine generator system is predetermined, and mean disconnect values based upon output capacity are determined. In addition, the at least one wind turbine generator system is assigned two different mean disconnect values. Another associated output capacity is assigned to each of the at least two mean disconnect values. For any output capacity required by the wind farm operator or power network operator, a mean disconnect value based upon output capacity can be determined from the at least two different mean disconnect values and the associated output capacities, via a computing unit.

The mean disconnect values that are based upon output capacity can be calculated via interpolation between the at least two mean disconnect values, or can be determined by storing a plurality of predeterminable output capacities and corresponding mean disconnect values which are based upon output capacity in a data storage unit, and reading out of said unit the corresponding mean disconnect value based upon output capacity at a predeterminable output capacity. Depending upon the output capacity, which can be predetermined externally, different mean disconnect values based upon output capacity are assigned to the at least one wind turbine generator system.

Preferably, averaging periods are assigned to the at least two stored mean disconnect values. The mean values that are based upon output capacity, which are determined from the at least two stored mean disconnect values, are then also assigned to the averaging periods. The sliding mean values for wind speed are preferably measured by the anemometer, which is located on the nacelle of the wind turbine generator system. The sliding mean values can be compared with the mean disconnect values which are based upon output capacity, and, if the mean disconnect values based upon output capacity are exceeded for the same averaging period, the at least one wind turbine generator system, or even the group of wind turbine generator systems, will be automatically disconnected by a disconnection device. The level of the mean disconnect values is preferably inversely related to the length of the averaging period.

The predetermination of output capacity, which is preferably performed by the network operator or wind farm operator, can be performed for the individual wind turbine generator system or for the entire wind farm. Total output is divided internally, if applicable by an allocation unit, and a predetermined partial output is required from each individual wind turbine generator system or group of wind turbine generator systems.

The object is especially also attained with a wind turbine generator system having the characterizing features of a wind turbine generator system (WEA1, WEA2, WEA3, WEA4, WEA5) for implementing a method such as is described herein, which is intended for connection to an electric power network. It has a measuring device, which determines at least one actual value (vt1(WEA1), . . . , vt3(WEA5)) of a wind speed and/or a parameter associated with wind speed, and a control input, with which an adjustable output capacity (L) and/or a parameter associated with output capacity can be predetermined. It has a determination device (14), which provides at least one disconnect value (AL(WEA1)), which is based upon output capacity, from the predetermined output capacity (L) and/or a parameter associated with this, and/or via an external predetermination. It has an allocation device (11), which assigns the at least one disconnect value (AL (WEA1)) based upon output capacity to the at least one actual value (vt1(WEA1), . . . , vt3(WEA5)). It also has a comparator unit (12), which compares the at least one actual value (vt1 (WEA1), . . . , vt3(WEA5)) with the assigned disconnect value (AL(WEA1)) which is based upon output capacity. It further has a disconnection device (13), which automatically disconnects the wind turbine generator system (WEA1, WEA2, WEA3, WEA4, WEA5) in the event that the actual value (vt1(WEA1), . . . , vt3(WEA5)) exceeds the disconnect value (AL(WEA1)) which is based upon output capacity.

The wind turbine generator system of the invention is suitable for implementation of one of the above-mentioned methods of operating at least one wind turbine generator system.

The wind turbine generator system of the invention has a measurement device for determining an actual value of a wind speed and/or a parameter associated with wind speed. This measurement device is preferably an anemometer.

The wind turbine generator system preferably has a control input, via which an adjustable output capacity and/or a parameter associated with said output capacity can be predetermined, especially via an external network operator. A disconnect value based upon output capacity can be assigned to the adjustable output capacity. The disconnect value based upon output capacity can also be either predetermined externally or determined internally, for example calculated. The assignment accounts for the fact that disconnect values at high predetermined output capacities must be selected to be lower, in order to prevent an overloading of the wind turbine generator system. In an allocation device according to the invention, a disconnect value based upon output capacity is assigned to the at least one actual value of a wind speed and/or a parameter associated with said wind speed. These two values can be compared with one another in a comparator unit, and, if the actual value exceeds the disconnect value based upon output capacity, the wind turbine generator system can be disconnected.

In a preferred embodiment of the invention, the measurement device is configured as an anemometer, which determines sliding mean values for wind speed for at least one, but preferably for a plurality of predetermined averaging periods. At a predetermined output capacity, for each averaging period an assigned mean disconnect value based upon output capacity can be determined. This preferably occurs in an allocation device, which assigns at least two mean disconnect values for the at least one predetermined averaging period to the at least one wind turbine generator system, and which assigns an associated output capacity to each of the at least two mean disconnect values. In a determination unit, the one mean disconnect value based upon output capacity, which corresponds with the adjustable, predetermined output capacity, can be determined from the at least two mean disconnect values and the associated output capacity. In a comparator unit according to the invention, the sliding mean value of the wind speed can be compared with the mean disconnect value assigned to the predetermined output capacity, and in a disconnection device, the at least one wind turbine generator system can be automatically disconnected when the sliding mean value for the at least one predetermined averaging period exceeds the mean disconnect value which is based upon output capacity.

The invention will be described within the context of three exemplary embodiments represented in five figures.

Figure 1A:
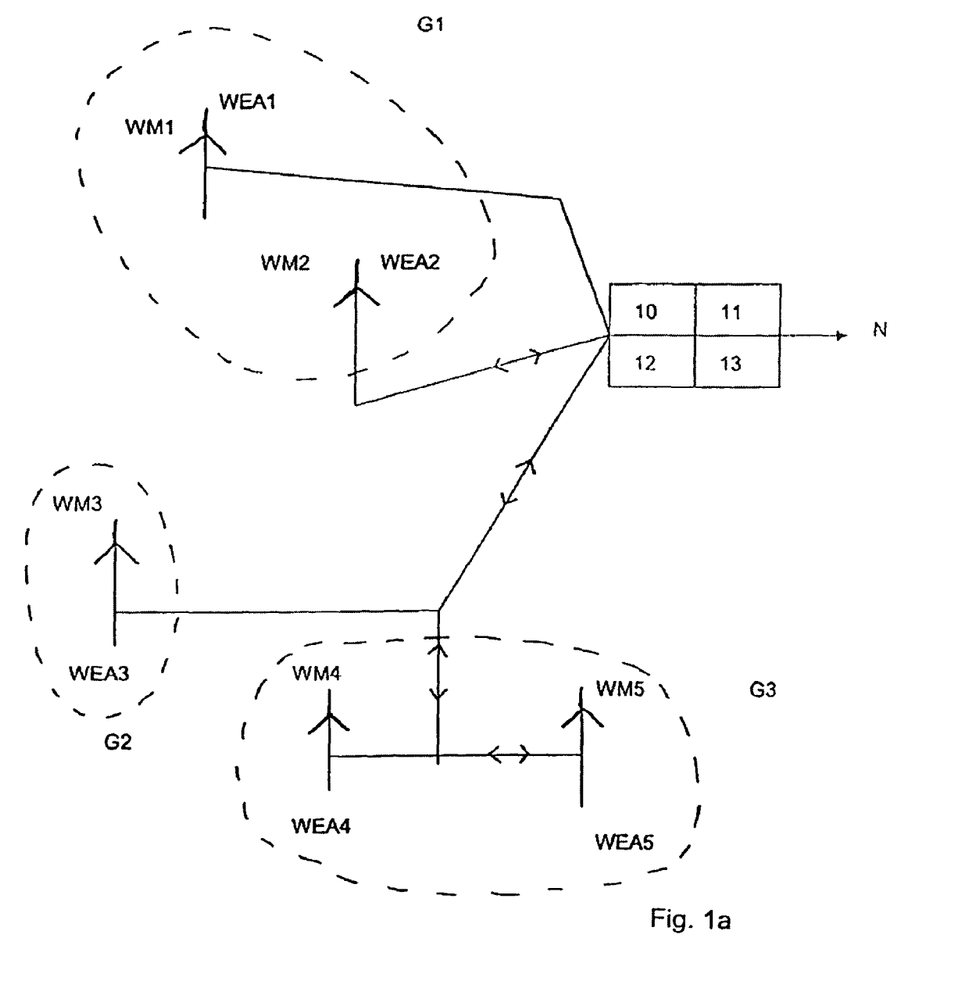
FIG. 1a shows a schematic view of a wind farm according to the invention in a first embodiment.

The wind farm represented in FIG. 1a has five wind turbine generator systems WEA1, WEA2, WEA3, WEA4, WEA5, the generated current from which is supplied to a public electric power network N. The five wind turbine generator systems WEA1, WEA2, WEA3, WEA4, WEA5 are divided into three groups G1, G2, G3. The first group G1 comprises the wind turbine generator systems WEA1 and WEA2, and the second group G2 comprises the single wind turbine generator system WEA3, and the fourth group G4 comprises the two wind turbine generator systems WEA4 and WEA5.

At each of the five wind turbine generator systems WEA1, WEA2, WEA3, WEA4, WEA5, an anemometer WM1, . . . , WM5 is located on the nacelle, for the purpose of measuring the respective wind speed occurring at the individual wind turbine generator system WEA1, WEA2, WEA3, WEA4, WEA5. Each anemometer WM1, . . . , WM5 transmits the measured wind speed values as data to a central data processing unit 10, in which, for three different averaging periods $t1=10$ min, $t2=1$ min, $t3=1$ sec, three sliding mean values vt1(WEA1), vt2(WEA1), vt3(WEA1) are continuously calculated for the first wind turbine generator system WEA1 and for each additional wind turbine generator system, up to the three sliding mean values vt1(WEA5), vt2(WEA5), vt3 (WEA5) for the fifth wind turbine generator system WEA5.

As an alternative to determining sliding mean values, any other type of mean value determination, for example using a pt1 element or other low pass function, or the use of up-down counters, which require a small amount of storage space, is also conceivable.

Figure 2:
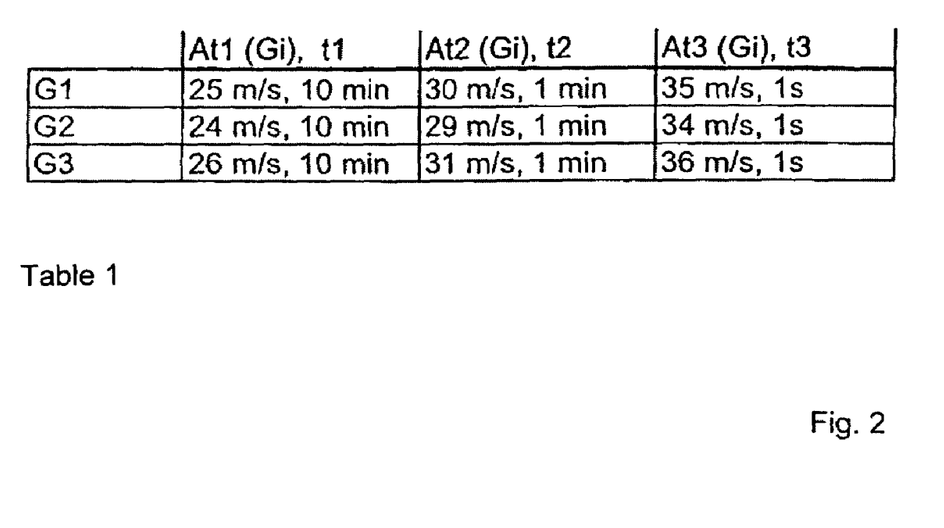
FIG. 2 shows a Table 1 showing sets of mean disconnect values and averaging periods assigned to three groups of wind turbine generator systems.

A set of mean disconnect values At1(G1), At2(G1), At3 (G1), which are associated with the three averaging periods t1, t2, t3, is assigned to the group G1. Correspondingly, a set of disconnect values At1(G2), At2(G2), At3(G2) or At1(G3), At2(G3), and At3(G3), which is associated with the same three averaging periods t1, t2, t3, is respectively assigned to each of the two groups G2, G3. FIG. 2 shows the pairs of numbers consisting of mean disconnect value and averaging period assigned to the three groups G1, G2, G3, in tabular form.

According to Table 1, the mean disconnect values At1 (G1) =25 m/s, At1(G2)=24 m/s and At3(G3)=26 m/s are assigned to the first averaging period t1=10 min. The different mean disconnect values assigned to the same averaging period therefore differ from one another only slightly, namely by 1 m/s.

The mean disconnect values At1(G1)=30 m/s, At1(G2)=29 m/s and At3(G3)=31 m/s assigned to the second averaging period t2=1 min also differ only slightly from one another, namely also by 1 m/s. The same is true of the three mean disconnect values At1(G1)=35 m/s, At1(G2)=34 m/s and At3 (G3)=36 m/s assigned to the third averaging period t3=1 sec.

Alternatively, the mean disconnect values At2(Gi) for the averaging period t2 are selected to be higher by a so-called gust factor G(ti) than the mean disconnect values At1(Gi) of the averaging period t1. The gust factor G(ti) preferably amounts to G(t2)=1.2. Accordingly, the mean disconnect values At3(Gi) for the shorter averaging period t3 are calculated by multiplying them by a higher gust factor G(t3)=1.4. In contrast to the values At2(Gi) and At3(Gi) of Table 1, the corresponding values that have been calculated by multiplication by the gust factor have a wider spread.

Using a central allocation device 11, the five wind turbine generator systems WEA1, WEA2, WEA3, WEA4, WEA5 are first divided into the three groups G1, G2, G3, and each wind turbine generator system WEA1, WEA2, WEA3, WEA4, WEA5 is assigned the set of number pairs that belongs to the group G1, G2, G3, according to FIG. 2.

In a central comparator unit 12, the fifteen sliding mean values vt1(WEA1), vt3(WEA5), which are continuously determined in the data processing device 10, are compared with the associated mean disconnect values At1(G1), . . . , At3(G3), and, if an assigned sliding mean value vt1 (WEA1), . . . , vt3(WEA5) exceeds a mean disconnect value At1(G1), . . . , At3(G3), then those wind turbine generator systems WEA1, . . . , WEA5 in which it has been established that the mean disconnect value At1(G1), . . . , At3(G3) has been exceeded by the sliding mean value vt1(WEA1), . . . , vt3(WEA3) are disconnected. It is therefore also possible to automatically disconnect only a small number of wind turbine generator systems of a group G1, G2, G3, while other wind turbine generator systems, which are located, for example, in the wake of other systems and are therefore exposed to lower wind speeds, remain connected even though they belong to the same group G1, G2, G3. A central disconnection device 13 is provided for the disconnection.

Figure 1B:
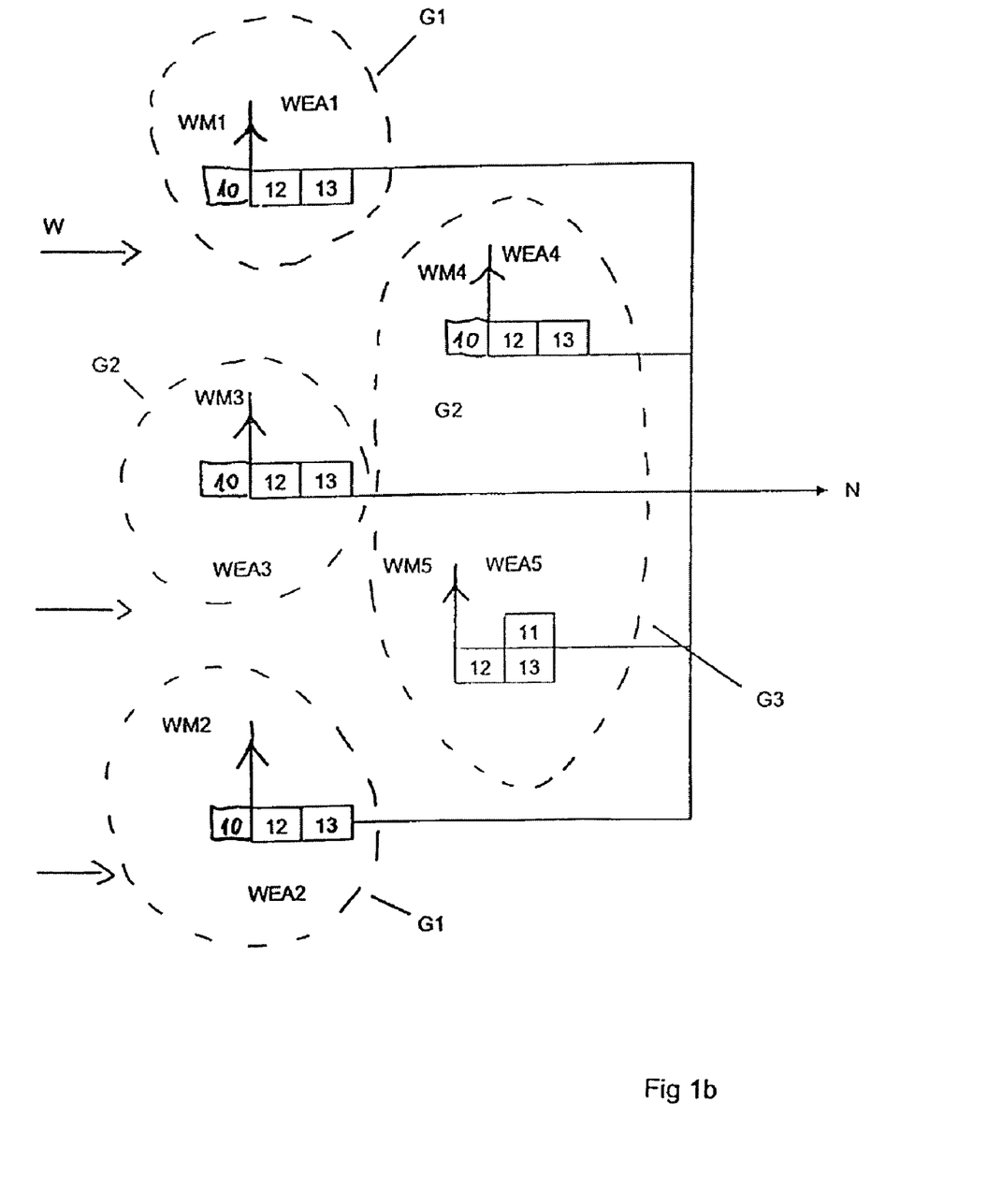
FIG. 1b shows a schematic view of a wind farm in a second embodiment.

FIG. 1b shows a wind farm in a second embodiment of the invention. In this case, the wind turbine generator systems WEA1, WEA2, WEA3, WEA4, WEA5 are arranged in two rows, which are parallel to one another and perpendicular to a main wind direction W. The first row contains the wind turbine generator systems of the first and second groups G1 and G2. In this, the wind turbine generator systems WEA 1, WEA 2 of the first group G1 are not adjacent to one another, but are situated separately from one another, which offers the advantage that a localized wind gust will not knock out the entire group of a farm. The group G3 contains WEA4 and WEA5, which lie in the second row in relation to the wind direction W.

It is also conceivable, in an expansion of the exemplary embodiment in FIG. 1b, for it to be taken into consideration in predetermining the mean disconnect values that different wind speeds occur in a wind farm, depending upon the wind farm row, over the longer time period, for example over a day, for example:

$1^{st}$ row: 25 m/s,
$2^{nd}$ row: 23 m/s,
$3^{rd}$ row: 24 m/s,
$4^{th}$ row: 23 m/s,
$5^{th}$ row: 22.5 m/s.

The predetermined disconnect values must be adjusted by this difference, in order to prevent a single gust from knocking out the entire farm. The first group G1 is formed by the wind turbine generator systems of the $1^{st}$ row, the second group G2 is formed by the wind turbine generator systems of the $2^{nd}$ row, etc. The difference between the disconnect values of the first group G1 and those of the second group G2 then does not amount to 1 m/s, as shown in Table 1, rather the disconnect values of the group G2 are 3 m/s lower than the disconnect values of the group G1, etc.

It is also conceivable for the wind turbine generator systems WEA1, WEA2, WEA3, WEA4, WEA5 of a group G1, G2, G3 to be assigned to different rows.

For each individual wind turbine generator system WEA1, WEA2, WEA3, WEA4, WEA5, a comparator unit 12, a disconnection device 13, and the data processing unit 10 are provided in a decentralized fashion. The sliding mean values are calculated physically at the assigned wind turbine generator system WEA1, . . . , WEA5.

The allocation device 11 is simple and central, but not physically separate, rather it is provided as a module in one of the wind turbine generator systems, in this case in the wind turbine generator system WEA5. This wind turbine generator system WEA5 assumes the function of a master wind turbine generator system. The rearrangement of the groups of mean disconnect values At(G1), . . . , At3(G3) is performed via a central allocation device 11, which is assigned as a module of one of the wind turbine generator systems WEA5.

If, for example, an average wind speed of 24.5 m/s was measured over the entire wind farm during a previous ten minute period, the wind turbine generator systems of the second group G2, in other words WEA3, will be disconnected. If, during the previous at least 10 minutes, an average wind speed of 25 m/s was reached, the wind turbine generator systems of the first and second groups G1 and G2 will be disconnected, which in this case are the wind turbine generator systems WEA1, WEA2 and WEA3.

Because the measurement of wind speed is taken at the individual wind turbine generator systems WEA1, WEA2, WEA3, WEA4, WEA5 by the anemometers WM1, . . . , WM5, there can be differences in the measured wind speed at the wind turbine generator systems of a group G1, G2, G3. In this exemplary embodiment, the wind turbine generator system of a group G1, G2, G3 is disconnected when one of the assigned mean disconnect values At1(G1), . . . , At3(G3) is exceeded.

The disconnection device 13 enables the disconnection of individual wind turbine generator systems WEA1, WEA2, WEA3, WEA4, WEA5 of a group G1, G2, G3. In the wind farm according to FIG. 1, with a sliding mean value for the wind speed of 25 m/s over 10 minutes, in addition to the wind turbine generator systems of the group G2, for example, only one of the wind turbine generator systems WEA1, WEA2 of the group G1 is disconnected, whereas the disconnection of the second wind turbine generator system of the group G1 is delayed, or does not occur at all.

The classification of the wind turbine generator systems WEA1, WEA2, WEA3, WEA4, WEA5 into groups G1, G2, G3 with assigned mean disconnect values At1(G1), . . . , At3(G3) and averaging periods t1, ... t3, in the manner described, makes it possible to prevent a "knockout" of the entire wind farm by a strong wind, because when specific boundary wind speeds are exceeded, only individual groups G1, G2, G3 of wind turbine generator systems are disconnected, but not the entire wind farm, in other words, parts of the wind farm are disconnected even before the highest possible disconnect speed is reached.

The values in Table 1 account for the fact that a wind turbine generator system can also withstand higher wind speeds over short periods of time without sustaining damage. Thus, the wind turbine generator system is not disconnected at all during brief increases in wind speed to, for example, 27 m/s, over a period of, for example, three minutes. However, if wind gusts reach a higher wind speed, wind turbine generator systems can be disconnected after only a relatively short period of time.

A corresponding method is used to connect the wind turbine generator system or the wind turbine generator farm.

Figure 3:
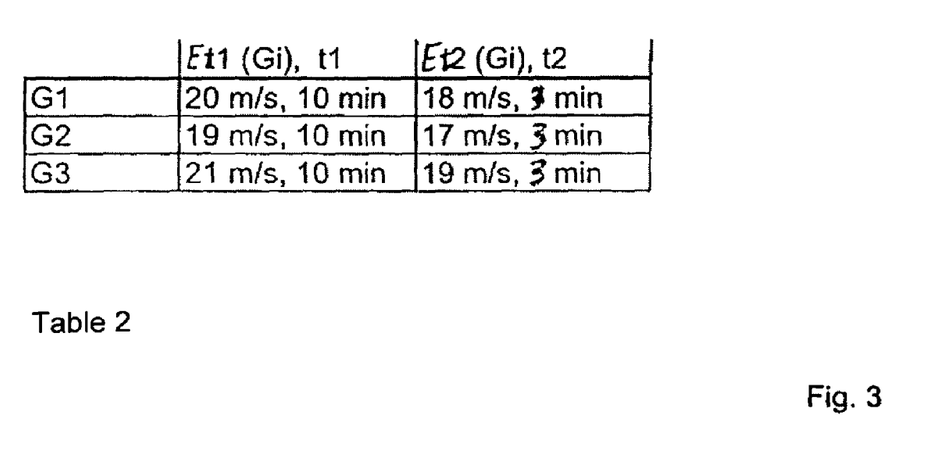
FIG. 3 shows a Table 2 with mean connect values and averaging periods.

The comparator unit 12 also checks for drops below mean connect values following disconnection. When the wind speed, measured at a wind turbine generator system WEA1, ..., WEA5 by the anemometer WM1, ..., WM5, drops below the mean connect value Eti(Gi) during a averaging period ti, the assigned wind turbine generator system WEA1, ..., WEA5 is reconnected. In order to prevent an overly frequent connection and disconnection of the wind turbine generator systems, disconnect values Ati(Gi) and connect values Eti(Gi) form a hysteresis. The connect values Eti(Gi) assigned to the same averaging period ti and the same group Gi lie below the mean disconnect values Ati(Gi). The difference between connect value Eti(Gi) and disconnect value Ati(Gi) of the same wind turbine generator system becomes greater as the averaging period becomes shorter. Table 2 shows mean connect values for two different averaging periods t1=10 min and t2=3 min. The difference between the mean disconnect values At2(Gi) in Table 2 is equal to the difference between the mean connect values At1(Gi) that belong to the same group.

Not shown is the connect value Et2(Gi), alternatively determined via division by a gust factor G(ti). The use of a gust factor G(ti) to calculate the mean connect values Et2(Gi) from the mean connect values Et1(Gi) leads, in turn, to a slight spreading between the differences.

Figure 4:
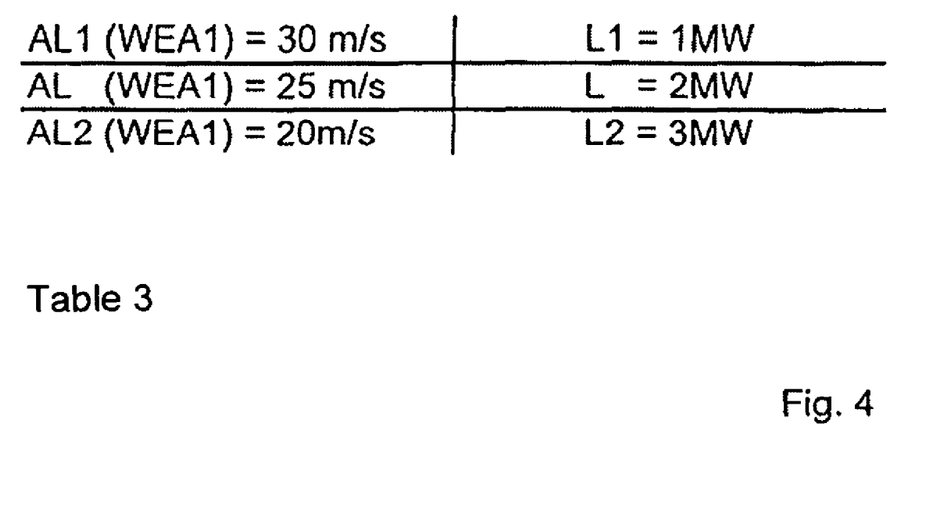
FIG. 4 shows a Table 3 of mean disconnect values and associated output capacities, along with mean disconnect values based upon output capacity, calculated from the former, with predetermined output capacities.

The mean disconnect values AL1(WEA1) and AL2(WEA1), assigned to the output capacities L1 and L2 in Table 3 of FIG. 4, relate to a single wind turbine generator system WEA1. The wind turbine generator system WEA1 can also be a component of the wind farm according to FIG. 1. The output capacity is determined in advance by a wind farm operator. The predetermination can be conducted in the form of a predetermined output capacity for the individual wind turbine generator system, or the predetermination of an output capacity can be conducted for the wind farm as a whole.

The individual wind turbine generator system WEA1 can withstand sustained higher wind speeds at a lower output capacity L1, especially with operation at a lower rotor speed, without sustaining damage. The mean disconnect values AL1(WEA1) can therefore be set higher with a low output capacity L1 than the mean disconnect values AL2(WEA1) for higher output capacities L2.

Figure 5:
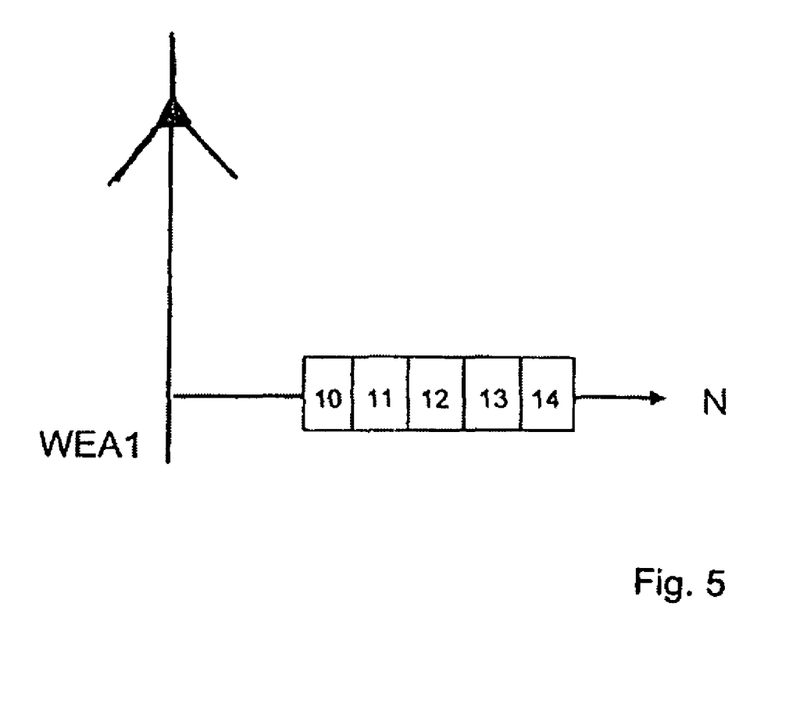
FIG. 5 shows a wind turbine generator system in a third embodiment of the invention, with operating devices.

The wind turbine generator system WEA 1 represented in FIG. 5 can withstand sustained wind speeds of up to 30 m/s at an assigned output capacity L1 of 1 MW. The mean disconnect value AL1(WEA1) is established at this wind speed value and is stored in a determination unit 14. A second pair consisting of a mean disconnect value AL2(WEA1)=20 m/s and an associated output capacity L1 at the level of the nominal capacity of L2=3 MW is assigned to the wind turbine generator system WEA1. This pair is also stored in the determination unit 14.

In the determination unit 14, which can be a component of the data processing unit 10, mean disconnect values AL(WEA1) for each predetermined output capacity L are determined. When the wind farm operator predetermines any output capacity L via a control input, the determination unit 14 determines a corresponding mean disconnect value AL(WEA1), which is based upon output capacity, from the two stored mean disconnect values AL1(WEA1), AL2(WEA1) and the two assigned, stored output capacities L1, L2. The determination can be made via linear or non-linear interpolation using the two stored mean disconnect values AL1(WEA1), AL2(WEA1) in the determination unit 14. In the exemplary embodiment presented in Table 3, the determination unit 14 calculates a mean disconnect value AL(WEA1)=25 m/s from the two stored mean disconnect values AL1(WEA1)=30 m/s and AL2(WEA1)=20 m/s, with correspondingly stored output capacities L1=1 MW and L2=3 MW at a predetermined output capacity of L=2 MW. Alternatively, it is also possible to store a precise table of mean disconnect values AL(WEA1) and assigned output capacities L(WEA1) in the determination unit 14, in which case their assigned mean disconnect values are read out as needed at predetermined output capacities.

A combination of the method for disconnecting the individual wind turbine generator system WEA1 according to FIG. 4 and FIG. 5 and the wind farm WEA1, ..., WEA5 according to FIG. 1a, 1b and FIG. 2 is also provided. A capacity L which is predetermined for the wind farm is divided by the allocation device 11 in relation to the level of the individual nominal capacities of the wind turbine generator systems WEA1, ..., WEA5, and a predetermined partial capacity is assigned to each wind turbine generator system WEA1, ..., WEA5.

The mean disconnect values AL(WEA1) for the wind turbine generator system WEA1 are dependent upon the averaging period t1, t2, t3. The disconnect values of Table 3 relate to an averaging period of t1=10 min and to the group G1. For averaging periods t2=1 min and t3=1 sec, according to Table 1, each of the three mean disconnect values AL1(WEA1), AL(WEA1), AL2(WEA1) for the group G1 is approximately 5 m/s or 10 m/s higher than is presented in Table 3. For the other two groups G2 and G3, the stored mean disconnect values AL1, AL2 are respectively decreased or increased in relation to these by 1 m/s. From the decreased and increased stored mean disconnect values, a mean disconnect value AL which is decreased or increased, respectively, is interpolated for the same predetermined output capacity.

For each of the three averaging periods t1, t2 and t3, at least two pairs of numbers adjusted to them, consisting of the predetermined output capacity L1, L2 and the corresponding predetermined mean disconnect value AL1(WEA1) or AL2(WEA2), are stored in the determination unit 14 of an individual wind turbine generator system WEA1.

In this case, not only is a single mean disconnect value At1(G1), ..., At2(G3) assigned to each table field of Table 1 for an averaging period t1, t2, t3, but each of the mean disconnect values (e.g., At1(G1)) is in turn dependent upon the assigned partial output capacity L, as is presented in Table 3.

In the comparator unit 12, the sliding mean values vt1(WEA1), vt2(WEA2) and vt3(WEA3) for the wind speed are compared with the mean disconnect value assigned to the same averaging period t1, t2, t3, and the assigned wind turbine generator system or group G1, G2, G3 of wind turbine generator systems is automatically disconnected.

Preferably, in addition to the described determination of the sliding mean value of the wind speed for three different averaging periods, the pitch angle of the rotor blades is detected, and, when either a disconnect angle is exceeded or the mean disconnect value for wind speed is exceeded, the wind turbine generator system is disconnected. This serves to ensure that the wind turbine generator system is also disconnected in the event of a malfunction of the anemometer.

The invention claimed is:

1. A method of operating a wind farm comprising at least three wind turbine generator systems (WEA1, WEA2, WEA3, WEA4, WEA5), which is suitable for connection to an electric power network,
   in which for each of the at least three wind turbine generator systems (WEA1, WEA2, WEA3, WEA4 and WEA5) at least one actual value (vt1(WEA1), ..., vt3(WEA5)) for a wind speed and/or for a parameter associated with wind speed is determined,
   wherein the at least two wind turbine generator systems (WEA1, WEA2, WEA3, WEA4, WEA5) are divided by means of an allocation device, at least temporarily, into at least two predetermined groups (G1, G2, G3), whereby at least one of the groups (G1, G2, G3) comprises at least two wind turbine generator systems (WEA1, WEA2, WEA3, WEA4, WEA5),
   and wherein each wind turbine generator system of the first group (G1) is assigned at least one first disconnect value (At1(G1), At2(G1), At3(G1)), and each wind turbine generator system of the second group (G2) is assigned at least one second disconnect value (At1(G2), At2(G2), At3(G2)) which is different from the at least one first disconnect value (At1(G1), At2(G1), At3(G1)), and the at least one actual value (vt1(WEA1), ..., vt3(WEA5)) is assigned to one of the disconnect values (At1(G1), ..., At3(G3)), and the actual values (vt1(WEA1), ..., vt3(WEA3)) are compared with the assigned disconnect values (At1(G1), ..., At3(G3)),
   and wherein when the assigned actual value (vt1(WEA1), ..., vt3(WEA3)) exceeds a disconnect value (At1(G1), ..., At3(G3)), the wind turbine generator system or group of wind turbine generator systems (G1, G2, G3) which is assigned to the disconnect value (At1(G1), ..., At3(G3)) is automatically disconnected.

2. The method according to claim 1, wherein the actual values are determined as mean values (vt1(WEA1), ..., vt3(WEA3)) for the wind speed for at least one predetermined averaging period (t1, t2, t3) for each of the at least two wind turbine generator systems (WEW1, ..., WEA5),
   and wherein each wind turbine generator system of the first group (G1) is assigned at least one first disconnect value (At1(G1), At2(G1), At3(G1)) for the at least one predetermined averaging period (t1, t2, t3),
   and wherein each wind turbine generator system of the second group (G2) is assigned at least one second disconnect value (At1(G2), At2(G2), At3(G2)) for the at least one predetermined averaging period (t1, t2, t3), which value is different from the at least one first disconnect value (At1(G1), At2(G1), At3(G1)),
   and wherein the mean values (vt1(WEA1), ..., vt3(WEA3)) are compared with the assigned disconnect values (At1(G1), ..., At3(G3)),
   and wherein when the assigned mean value (vt1(WEA1), ..., vt3(WEA3)) for the at least one predetermined averaging period (t1, t2, t3) exceeds a disconnect value (At1(G1), ..., At3(G3)), the wind turbine generator system or group of wind turbine generator systems (G1, G2, G3) which is assigned to the disconnect value (At1(G1), ..., At3(G3)) is automatically disconnected.

3. The method according to claim 1, wherein the disconnect values ((At1(G1), ..., At3(G3)) assigned to the at least two groups (G1, G2, G3) are changed.

4. The method according to claim 1, wherein at least one group (G1, G2, G3) is assigned different disconnect values (At1(G1), ..., At3(G3)) for different averaging periods (t1, t2, t3), and the disconnect values (At1(G1), ..., At3(G3)) are selected to be higher, the shorter the selected averaging periods (t1, t2, t3).

5. The method according to claim 1, wherein the sets of different disconnect values (At1(G1), ..., At3(G3)) assigned to the at least two groups (G1, G2, G3) are redistributed between the at least two groups (G1, G2, G3).

6. A method of operating at least one wind turbine generator system (WEA1, WEA2, WEA3, WEA4, WEA5), which is suitable for connection to an electric power network, in which at least one actual value (vt1(WEA1), ..., vt3(WEA3)) for a wind speed and/or a parameter associated with wind speed is determined,
   an adjustable output capacity (L) and/or a parameter associated with output capacity is predetermined for the at least one wind turbine generator system (WEA1, WEA2, WEA3, WEA4, WEA5),
   at least one disconnect value (AL(WEA1)) based upon output capacity, which corresponds with the adjustably predetermined output capacity (L) and/or the parameter associated with output capacity, is provided,
   one of the at least one disconnect values (AL(WEA1)) based upon output capacity is assigned to each of the at least one actual values (vt1(WEA1), ..., vt3(WEA3)),
   and the at least one actual value (vt1(WEA1), ..., vt3(WEA3)) is compared with the at least one assigned disconnect value (AL(WEA1)) which is based upon output capacity,
   and, if the actual value (vt1(WEA1), ..., vt3(WEA3) exceeds the disconnect value (AL(WEA1) which is based upon output capacity, the assigned at least one wind turbine generator system (WEA1, WEA2, WEA3, WEA4, WEA5) is automatically disconnected.

7. The method according to claim 6, wherein at least two disconnect values (AL1 (WEA1), (AL2(WEA1)) are assigned to the at least one wind turbine generator system (WEA1, WEA2, WEA3, WEA4, WEA5),
   and an associated output capacity (L1, L2) is assigned to each of the at least two disconnect values (AL1(WEA1), (AL2(WEA1)),
   and from the at least two disconnect values (AL1 (WEA1), (AL2(WEA 1)) and the assigned output capacities (L1, L2), a disconnect value (AL(WEA1)) which is based upon output capacity and which corresponds with the adjustable, predetermined output capacity (L) is determined.

8. The method according to claim 6, wherein mean values (vt1(WEA1), ..., vt3(WEA3)) for the wind speed are determined as actual values for at least one predetermined averaging period (t1, t2, t3),
   and at least two disconnect values (AL1 (WEA1), (AL2 (WEA1)) for the at least one predetermined averaging period (t1, t2, t3) are assigned to the at least one wind turbine generator system (WEA1, WEA2, WEA3, WEA4, WEA5),
   and the mean values (vt1(WEA1), ..., vt3(WEA3)) are compared with the disconnect value (AL(WEA1)) based upon output capacity, and, when the mean value (vt1(WEA1), ..., vt3(WEA3)) for the at least one predetermined averaging period (t1, t2, t3) exceeds the disconnect value (AL(WEA1) which is based upon output capacity, the assigned at least one wind turbine generator system (WEA1, WEA2, WEA3, WEA4, WEA5) is automatically disconnected.

9. The method according to claim 6, wherein the output capacity (L) is predetermined externally via a central wind farm operator or a network operator.

10. The wind farm according to claim 9, wherein the mean disconnect values (At1(G1), ..., At3(G3)) can be adjusted via the allocation device.

11. The wind farm according to claim 9, wherein different mean disconnect values (At1(G1), ..., At3(G3)) for different averaging periods can be assigned to at least one group (G1, G2, G3) by the allocation device, and the higher the mean disconnect values (At1(G1), ..., At3(G3)) are, the shorter the averaging periods (t1, t2, t3) are.

12. The wind farm according to claim 9, wherein the sets of different mean disconnect values (At1(G1), ..., At3(G3)) assigned to the at least two groups (G1, G2, G3) by the allocation device can be rearranged between the at least two groups (G1, G2, G3).

13. The method according to claim 6, wherein the disconnect value (AL(WEA1)) which is based upon output capacity is determined via interpolation between the at least two disconnect values (AL1(WEA1), (AL2(WEA1)).

14. The method according to claim 6, wherein a plurality of predetermined output capacities (L1, L2) and corresponding disconnect values based upon output capacity are stored in a data storage unit.

15. A wind farm comprising at least three wind turbine generator systems (WEA1, WEA2, WEA3, WEA4, WEA5), which is suitable for connection to an electric power network, with an anemometer (WM1, ..., WM5), located at each wind turbine generator system (WEA1, ..., WEA5), which determines at least one actual value (vt1(WEA1), ..., vt3(WEA5)) for a wind speed or a parameter associated with wind speed,
  an allocation device, which divides the at least two wind turbine generator systems (WEA1, WEA2, WEA3, WEA4, WEA5) at least temporarily into at least two predetermined groups (G1, G2, G3), whereby at least one of the groups (G1, G2, G3) comprises at least two wind turbine generator systems (WEA1, ..., WEA5), and assigns at least one first disconnect value (At1(G1), At2(G1), At3(G1)) to each wind turbine generator system (WEA1, WEA2) of a first group (G1), and assigns a second disconnect value (At1(G2), At2(G2), At3(G2)), which is different from the first disconnect value (At1(G1), At2(G1), At3(G1)), to each wind turbine generator system (WEA3) of a second group (G2),
  a comparator unit for comparing the at least one actual value (vt1(WEA1), ..., vt3(WEA3)) of a wind speed or a parameter associated with wind speed with the assigned disconnect values (At1(G1), ..., At3(G3)), and
  a disconnection device which disconnects the wind turbine generator system or group (G1, G2, G3) of wind turbine generator systems assigned to the mean disconnect value (At1(G1), ..., At3(G3)) in the event that the actual values (vt1(WEA1), ..., vt3(WEA3)) of a wind speed or a parameter associated with wind speed exceed a disconnect value (At1(G1), ..., At3(G3)).

16. The wind farm according to claim 15, wherein an anemometer (WM1, ..., WM5) is located at each wind turbine generator system (WEA1, ..., WEA5), which determines mean values (vt1(WEA1), ..., vt3(WEA3)) of the wind speed for at least one predetermined averaging period (t1, t2, t3),
  wherein an allocation device divides the at least two wind turbine generator systems (WEA1, WEA2, WEA3, WEA4, WEA5) at least temporarily into at least two predetermined groups (G1, G2, G3), and assigns at least one first mean disconnect value (At1(G1), At2(G1), At3(G1)) to each wind turbine generator system (WEA1, WEA2) of a first group (G1), and assigns a second mean disconnect value (At1(G2), At2(G2), At3(G2)), which is different from the first mean disconnect value (At1(G1), At2(G1), At3(G1)), to each wind turbine generator system (WEA3) of a second group (G2),
  wherein a comparator unit compares the mean values (vt1(WEA1), ..., vt3(WEA3)) with the assigned mean disconnect values (At1(G1), ..., At3(G3)),
  and wherein a disconnection device disconnects the wind turbine generator system or group (G1, G2, G3) of wind turbine generator systems assigned to the mean disconnect value (At1(G1), ..., At3(G3)) in the event that the mean value (vt1(WEA1), ..., vt3(WEA3)) exceeds a mean disconnect value (At1(G1), ..., At3(G3)).

17. A wind turbine generator system (WEA1, WEA2, WEA3, WEA4, WEA5), which is suitable for connection to an electric power network, comprising
  a measuring device, which determines at least one actual value (vt1(WEA1), ..., vt3(WEA5)) of a wind speed and/or a parameter associated with wind speed,
  a control input, with which an adjustable output capacity (L) and/or a parameter associated with output capacity can be predetermined,
  a determination device, which provides at least one disconnect value (AL(WEA1)), which is based upon output capacity, from the predetermined output capacity (L) and/or a parameter associated with this, and/or via an external predetermination,
  an allocation device, which assigns the at least one disconnect value (AL(WEA 1)) based upon output capacity to the at least one actual value (vt1(WEA1), ..., vt3(WEA5)),
  a comparator unit, which compares the at least one actual value (vt1(WEA1), ..., vt3(WEA5)) with the assigned disconnect value (AL(WEA1)) which is based upon output capacity, and
  a disconnection device, which automatically disconnects the wind turbine generator system (WEA1, WEA2, WEA3, WEA4, WEA5) in the event that the actual value (vt1(WEA1), ..., vt3(WEA5)) exceeds the disconnect value (AL(WEA1)) which is based upon output capacity.

18. The wind turbine generator system according to claim 17, wherein an anemometer determines mean values (vt1(WEA1), ..., vt3(WEA3)) for wind speed for at least one predetermined averaging period (t1, t2, t3),
  an allocation device assigns at least two mean disconnect values for the at least one predetermined averaging period (t1, t2, t3) to the at least one wind turbine generator system (WEA1, WEA2, WEA3, WEA4, WEA5), and which assigns an associated output capacity (L1, L2) to each of the at least two mean disconnect values,
  a determination unit determines a mean disconnect value, which is based upon output capacity and which corresponds with the adjustable, predetermined output capacity (L), from the at least two mean disconnect values and associated output capacities (L1, L2), a comparator unit compares mean values (vt1(WEA1), ..., vt3(WEA3)) for wind speed with the mean disconnect value assigned to the predetermined output capacity (L), a disconnection device automatically disconnects the assigned at least one wind turbine generator system in the event that the mean value (vt1(WEA1), ..., vt3(WEA3)) for the at least one predetermined averaging period (t1, t2, t3) exceeds the mean disconnect value which is based upon output capacity.

19. The wind turbine generator system according to claim 18, wherein a control input for a central wind farm operator or network operator externally predetermines output capacities (L).

20. The wind farm of claim 17 comprising at least two wind turbine generator systems (WEA1, WEA2, WEA3, WEA4, WEA5) wherein an allocation device divides a predetermined total output among the at least two wind turbine generator systems (WEA1, WEA2, WEA3, WEA4, WEA5).

* * * * *